United States Patent
Bernal et al.

(10) Patent No.: US 9,361,690 B2
(45) Date of Patent: Jun. 7, 2016

(54) VIDEO BASED METHOD AND SYSTEM FOR AUTOMATED SIDE-BY-SIDE TRAFFIC LOAD BALANCING

(71) Applicant: Xerox Corporation, Norwalk, CT (US)

(72) Inventors: Edgar A. Bernal, Webster, NY (US); Aaron Michael Burry, Ontario, NY (US)

(73) Assignee: Xerox Corporation, Norwalk, CT (US)

(*) Notice: Subject to any disclaimer, the term of this patent is extended or adjusted under 35 U.S.C. 154(b) by 147 days.

(21) Appl. No.: 14/050,041

(22) Filed: Oct. 9, 2013

(65) Prior Publication Data

US 2015/0098621 A1    Apr. 9, 2015

(51) Int. Cl.
| | | |
|---|---|---|
| G06K 9/00 | (2006.01) |
| G06T 7/00 | (2006.01) |
| G06Q 10/00 | (2012.01) |
| G08G 1/04 | (2006.01) |
| G08G 1/065 | (2006.01) |
| G08G 1/095 | (2006.01) |
| G07C 11/00 | (2006.01) |
| G08G 1/015 | (2006.01) |
| G08G 1/017 | (2006.01) |
| G08G 1/02 | (2006.01) |
| G08G 1/042 | (2006.01) |
| G08G 1/0967 | (2006.01) |

(52) U.S. Cl.
CPC .............. *G06T 7/0022* (2013.01); *G06Q 10/00* (2013.01); *G07C 11/00* (2013.01); *G08G 1/04* (2013.01); *G08G 1/065* (2013.01); *G08G 1/095* (2013.01); *G06T 2207/10004* (2013.01); *G06T 2207/30236* (2013.01); *G08G 1/015* (2013.01); *G08G 1/0175* (2013.01); *G08G 1/02* (2013.01); *G08G 1/042* (2013.01); *G08G 1/096716* (2013.01); *G08G 1/096783* (2013.01)

(58) Field of Classification Search
CPC ...... G06K 9/00785; G06Q 50/12; G08G 1/01
See application file for complete search history.

(56) References Cited

U.S. PATENT DOCUMENTS

| | | | | |
|---|---|---|---|---|
| 5,163,000 A | * | 11/1992 | Rogers et al. | 701/1 |
| 5,678,335 A | * | 10/1997 | Gomi | G09F 9/302 |
| | | | | 362/800 |
| 6,842,719 B1 | * | 1/2005 | Fitzpatrick | G06Q 10/06 |
| | | | | 340/286.09 |
| 8,254,625 B2 | * | 8/2012 | Coulter et al. | 382/103 |
| 2005/0033505 A1 | * | 2/2005 | Zatz | 701/117 |
| 2005/0073434 A1 | * | 4/2005 | Arquette | G08G 1/01 |
| | | | | 340/907 |
| 2008/0120880 A1 | * | 5/2008 | Stadjuhar | G09F 9/00 |
| | | | | 40/624 |
| 2011/0258011 A1 | * | 10/2011 | Burns et al. | 705/7.15 |
| 2014/0258062 A1 | * | 9/2014 | Calman et al. | 705/35 |
| 2015/0054957 A1 | * | 2/2015 | Gross et al. | 348/149 |
| 2015/0070471 A1 | * | 3/2015 | Loce | G06Q 20/38 |
| | | | | 348/47 |

* cited by examiner

*Primary Examiner* — Bhavesh Mehta
*Assistant Examiner* — Ian Lemieux

(57) ABSTRACT

A method, non-transitory computer readable medium, and apparatus for side-by-side traffic location load balancing are disclosed. For example, the method receives one or more video images of a side-by-side traffic location, determines a number of cars in a first lane and a number of cars in a second lane of the side-by-side traffic location based upon the one or more video images, calculates a delta between the number of cars in the first lane and the number of cars in the second lane and recommends the first lane or the second lane based upon the delta and a respective weighting factor associated with the first lane and the second lane to provide a load balance of the cars at the side-by-side traffic location.

16 Claims, 4 Drawing Sheets

VIDEO BASED METHOD AND SYSTEM FOR AUTOMATED SIDE-BY-SIDE TRAFFIC LOAD BALANCING

The present disclosure relates generally to management of traffic loads and, more particularly, to a video based method and system for automated side-by-side vehicular or pedestrian traffic load balancing.

BACKGROUND

Due to increased customer throughput relative to traditional drive-thru configurations, fast food restaurants are adopting a side-by-side drive-thru configuration. While the side-by-side drive-thru has benefits regarding the maximum drive-thru customer per hour rate a restaurant can achieve, it presents new challenges to restaurants.

One example of a new problem the side-by-side drive-thru presents is maintaining the correct order sequence. In particular, many side-by-side configurations merge the cars into a single lane for payment and order pickup. As a result, vehicle sequences can become shuffled between the time the order is placed and the time the customer receives the order. Another example of a problem of the side-by-side drive-thru presents is potential for imbalance in the lanes as one lane may contain a larger number of vehicles than another lane for a variety of reasons.

Presently, to address these new challenges, managers may deploy an employee to go outside to manually manage the drive-thru lanes. However, this then lowers productivity from the restaurant as one fewer employee is available to take orders, prepare food, complete orders, and the like.

SUMMARY

According to aspects illustrated herein, there are provided a method, a non-transitory computer readable medium, and an apparatus for side-by-side traffic location load balancing. One disclosed feature of the embodiments is a method that receives one or more video images of a side-by-side traffic location, determines a number of cars in a first lane and a number of cars in a second lane of the side-by-side traffic location based upon the one or more video images, calculates a delta between the number of cars in the first lane and the number of cars in the second lane and recommends the first lane or the second lane based upon the delta and a respective weighting factor associated with the first lane and the second lane to provide a load balance of the cars at the side-by-side traffic location.

Another disclosed feature of the embodiments is a non-transitory computer-readable medium having stored thereon a plurality of instructions, the plurality of instructions including instructions which, when executed by a processor, cause the processor to perform operations that receive one or more video images of a side-by-side traffic location, determine a number of cars in a first lane and a number of cars in a second lane of the side-by-side traffic location based upon the one or more video images, calculate a delta between the number of cars in the first lane and the number of cars in the second lane and recommend the first lane or the second lane based upon the delta and a respective weighting factor associated with the first lane and the second lane to provide a load balance of the cars at the side-by-side traffic location.

Another disclosed feature of the embodiments is an apparatus comprising a processor and a computer readable medium storing a plurality of instructions which, when executed by the processor, cause the processor to perform an operation that receives one or more video images of a side-by-side traffic location, determines a number of cars in a first lane and a number of cars in a second lane of the side-by-side traffic location based upon the one or more video images, calculates a delta between the number of cars in the first lane and the number of cars in the second lane and recommends the first lane or the second lane based upon the delta and a respective weighting factor associated with the first lane and the second lane to provide a load balance of the cars at the side-by-side traffic location.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for load balancing a drive-thru having a side-by-side configuration. Although the examples described herein relate to a drive-thru, the present disclosure may be broadly applied to any vehicular or pedestrian traffic scenario that has a side-by-side or parallel lane configuration having a number of lanes that split or merge into a different number of lanes where a service is provided or process is fulfilled, with potentially varying service or process times across different lanes or different lines of customers, e.g., a toll booth stop, pedestrian lines at a bureau of motor vehicles, an entrance to a stadium or amusement park, checkout lines at a retailer, and the like. As discussed above, the side-by-side drive-thru configuration presents new challenges to restaurants.

One example of a new problem of the side-by-side traffic, e.g., a side-by-side drive-thru, presents is maintaining the correct order sequence, as vehicle sequences can become shuffled between the time the order is placed and the time the customer receives the order due to the parallel nature of the configuration. Another example of a problem of the side-by-side drive-thru presents is potential for imbalance in the lanes as one lane may contain a larger number of vehicles than another lane for a variety of reasons. For example, vehicles may have a tendency to favor an inner lane because they are unfamiliar with the side-by-side configuration or other reasons. In some cases, restaurants may choose to place dense shrubbery in the median between drive-thru lanes for aesthetical purposes, which may prevent customers from accurately evaluating traffic on the opposite lane. Additionally, menu and order boards can also affect visibility of opposite lanes.

As a result, the main lane may appear to be artificially congested due to an imbalance farther down the drive-thru path where the main lane splits into the side-by-side order lanes. In this case, customers may drive by the restaurant even though one of the lanes may be empty or less than full capacity. Alternatively, customers may drive out of the lane if one lane is taking much longer than the other lane. Drive-thru imbalance also may lead to a perception of lack of customer equity when vehicles drive past the line and enter a drive-thru lane that turns out to have available space and/or to be moving faster. One embodiment of the present disclosure provides automated load balancing of a drive-thru having a side-by-side configuration to improve customer satisfaction and customer retention.

Figure 1:
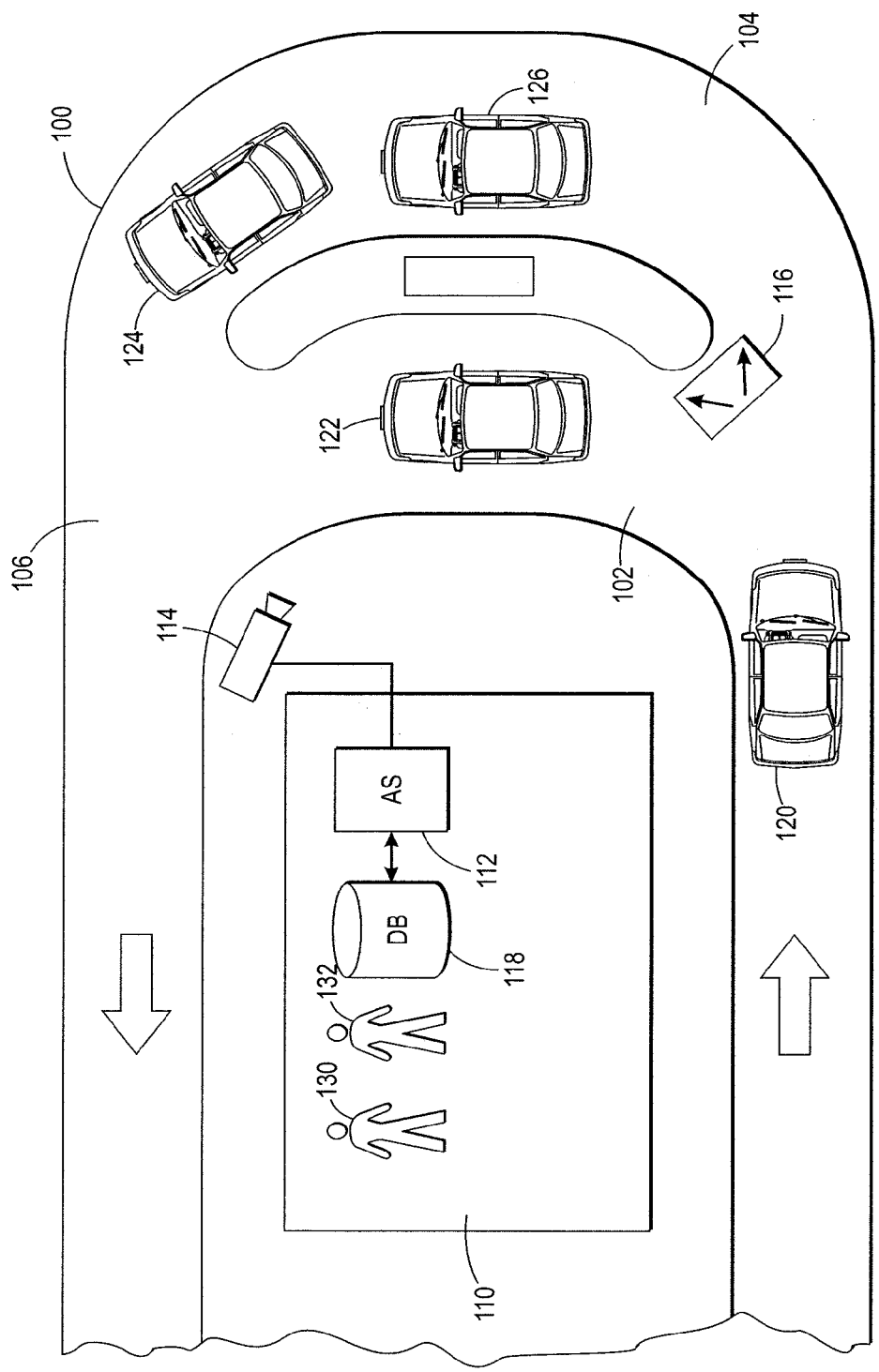
FIG. 1 illustrates an example system for load balancing a drive-thru having a side-by-side configuration.

FIG. 1 illustrates an example top view of a drive-thru 100 having a side-by-side configuration of a restaurant 110. In one embodiment, the drive thru 100 may have a first lane 102 and a second lane 104. The first lane 102 may also be referred to as an inner lane or a left lane. The second lane 104 may also be referred to as an outer lane or a right lane. The drive-thru 100 may also include a merge point 106 where cars, such as cars 120, 122, 124 and 126 merge from the first lane 102 and the second lane 104. The term "cars" is used herein to refer broadly to any type of vehicle such as, for example, a sedan, a truck, a sport utility vehicle (SUV), a motorcycle, a bicycle, and the like. It should be noted that although the present disclosure is described with respect to a drive-thru having a side-by-side configuration, the present disclosure may be applied to a drive-thru having any number of multiple parallel lanes. In addition, the present disclosure may be applied more generally to any vehicular or pedestrian traffic scenario that has a side-by-side or parallel lane configuration having a number of lanes that split or merge into a different number of lanes where a service is provided or a process fulfilled, with potentially varying service or process times across lanes or customers.

In one embodiment, the drive thru lanes 102 and 104 may be monitored by a video camera 114. In one embodiment, the video camera 114 may be a standard red, green, blue (RGB) video camera with a 1280×720 pixel resolution and a frame rate of 30 frames per second (fps). In another embodiment, a video graphics array (VGA) video camera with a 640×480 pixel resolution and a frame rate of 15 fps may be used.

In one embodiment, the video camera 114 may send video images to an application server (AS) 112. The video camera 114 may be in communication with the AS 112 via a wired or wireless connection. In one embodiment, the AS 112 may be located inside the restaurant 110 or another remote location.

In one embodiment, a broadcasting module 116 may be located at an entrance of the drive-thru 100. In one embodiment, the broadcasting module 116 may be a display that indicates to the entering car 120 which lane the car 120 should enter. For example, the broadcasting module 116 may display a right arrow and a left arrow, a light indicating which lane the car should enter, words indicating "right lane" or "left lane," and the like.

In one embodiment, the broadcasting module 116 may be in communication with the AS 112 via a wired or wireless connection. The AS 112 may make a recommendation based upon analysis of video images received from the video camera 114 and weighting factors stored in a database (DB) 118. The AS 112 may send the broadcasting module 116 the appropriate recommendation and the broadcasting module 116 may display the corresponding recommendation to the entering car 120.

In one embodiment, the weighting factors may be based upon data collected over a period of time. For example, the period of time may be an hour, a month, a year or any other time period. In another example, the period of time may be a time period an employee 130 or 132 has been employed; alternatively, the period of time may be the length of the shift of employee 130 or 132.

In one embodiment, the weighting factors may be based on a collection of data of an expected number of cars to visit the drive-thru 100 at various times in a day based upon a day of the week. For example, data may be collected as a histogram of a number of cars per hour and/or a number of cars per day of the week, and the like.

In one embodiment, the weighting factors may be based on a vehicle type. For example, larger vehicles may tend to correlate with longer order placing intervals. In one embodiment, the weighting factors may also be based on a vehicle occupancy. For example, vehicles with more passengers may have a longer order time due to more orders being placed for the larger number of passengers. Examples of video analysis algorithms to detect a vehicle type or size and a vehicle occupancy may include U.S. patent Ser. No. 13/215,401 filed on Aug. 23, 2011, Ser. No. 13/677,548 filed on Nov. 15, 2012, Ser. No. 13/312,318 filed on Dec. 6, 2011, Ser. No. 12/476, 334 filed on May 21, 2012, Ser. No. 13/416,436 filed on Mar. 9, 2012, U.S. Ser. No. 13/963,472 filed on Aug. 9, 2013, Ser. No. 13/914,752 filed on Jun. 11, 2013, each assigned to Xerox® Corporation and each incorporated by reference in its entirety.

In another embodiment, the weighting factors may be based on a collection of data about performance and order completion rates of the employees 130 and 132. For example, the employee 130 may complete 4 orders per minute while taking orders for the drive-thru 100 and the employee 132 may only complete 1 order per minute while taking orders for the drive-thru 100. Although only two employees 130 and 132 are illustrated in FIG. 1, it should be noted that the data may be collected for any number of employees or for entire shifts comprising a plurality of employees.

In one embodiment, the weighting factors may be based on a collection of data regarding each shift change. For example, during an hour when a shift change occurs, the order processing rate and the order completion rate may suffer. In another example, the order processing rate and order completion rate may be faster for the morning shift than an afternoon shift, and the like.

In one embodiment, the weighting factors may be calculated for the left lane 102 and the right lane 104 independently. In other words, the left lane 102 and the right lane 104 may have different weighting factors. For example, depending on which employee 130 or 132 is taking orders for the left lane 102 and the right lane 104 the weighting factor may be different for each lane.

In one embodiment, the weighting factor may be based upon one or more of the collection of data described above over a sliding window (e.g., every 10 minutes, every hour, and the like). In other words, the weighting factors may change during different times or periods during the day to account for a change in an expected number of cars, a shift change or a change in the employee working the drive-thru 100.

In one embodiment, the weighting factors may be used for each lane 102 and 104 along with a delta calculated by the AS 112 to make a lane recommendation to the incoming car 120. In one embodiment, the AS 112 may be configured with various modules to analyze the video images received by the video camera 114 to calculate the delta, calculate and apply the weighting factors to each lane 102 and 104 and make a recommendation. Weighting of a lane count can be implemented via multiplicative, additive, and other linear and non-linear functions of the count, so as to penalize or reward the determined count relative to one or more of the weighting factors described above.

Figure 2:
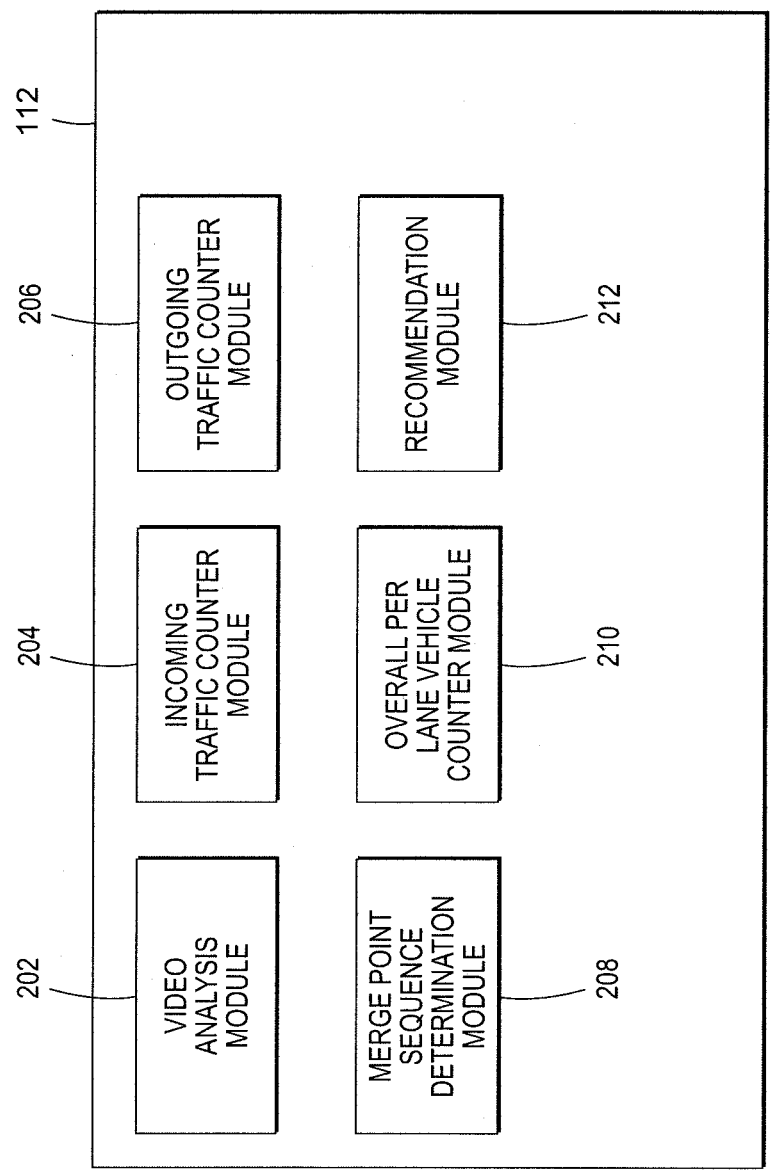
FIG. 2 illustrates an example of modules that perform the load balancing.

FIG. 2 illustrates one embodiment of the AS 112. In one embodiment, the AS 112 may include a video analysis module 202, an incoming traffic counter module 204, an outgoing traffic counter module 206, a merge point sequence determination module 208, an overall per lane vehicle counter module 210 and a recommendation module 212. Although, FIG. 2 illustrates the modules 202, 204, 206, 208 and 210 as separate modules, all of the modules may be deployed as one or more combination of modules or a single module. The AS 112 may also include other modules and interfaces, such as a computer readable memory and a processor, similar to the general purpose computer 400 described below and illustrated in FIG. 4.

In one embodiment, the video analysis module 202 may analyze the video images received from the video camera 114. In one embodiment, the video analysis module 202 may analyze a region of interest (e.g., two regions of interest including a first lane 102 and a second lane 104) to identify pixels in the video image as car and identification information about each car, such as a color, a license plate number, a make and model of the car, and the like. The information parsed from the analysis of the video images may be used by the remaining modules to perform each respective function.

In one embodiment, the video analysis module 202 may use any available video analysis. Examples of video analysis algorithms that can be used include automatic license plate recognition, algorithms that detect cars based upon a sustained presence of motion across a corresponding region of interest, a temporal frame differencing followed by morphological operations, background estimation and subtraction, and the like. Examples of video analysis algorithms may also be found in U.S. patent Ser. No. 13/453,245, filed on Apr. 23, 2012, Ser. No. 13/768,883, filed on Feb. 15, 2013, Ser. No. 13/364,768 filed on Feb. 2, 2012, Ser. No. 14/017,360 filed on Sep. 4, 2013, Ser. No. 13/973,330 filed on Aug. 22, 2013, and U.S. Pat. No. 8,401,230 issued on Nov. 29, 2012, each assigned to Xerox® Corporation and each incorporated by reference in its entirety.

In one embodiment, the incoming traffic counter module 204 may count the number of cars entering each lane 102 and 104 of the drive-thru 100. For example, based on the identification of one or more cars of the video image by the video analysis module 202, the incoming traffic counter module 204 may count each incoming car in each lane 102 and 104. In addition, the incoming traffic counter module 204 may track the information associated with each car that enters the lanes 102 and 104 obtained by the video analysis module 202.

In another embodiment, the incoming traffic counter module 204 may count the incoming traffic in each lane 102 and 104 without the video image. For example, a sensor may be placed at the entrance of each lane 102 and 104 that is in communication with the incoming traffic counter module 204 in the AS 112. Each time the sensor detects a car, a signal may be sent to the incoming traffic counter module 204 for lane 102 or 104. The sensor may be an electronic sensor, a motion sensor, a pressure sensor, an inductive loop sensor, and the like.

In one embodiment, the outgoing traffic counter module 206 may be optional. The outgoing traffic counter module 206 may be unnecessary if a car cannot escape either the first lane 102 or the second lane 104 of the drive-thru 100. For example, the first lane 102 may be surrounded by an order window and a curb of the second lane 104 and the second lane 104 may be surrounded by an order window and another curb or wall.

However, in some drive-thru locations, the second lane 104 may be adjacent to a parking lot or open area where the car 126 in the second lane 104 may simply leave the queue and drive away. Thus, the outgoing traffic counter module 206 may count each time the video analysis module 202 detects a car leaving the region of interest in the video image. In addition, the outgoing traffic counter module 206 may track the information associated with each car that leaves obtained by the video analysis module 202.

In one embodiment, the merge point sequence determination module 208 may count the number of cars that leave each lane through the merge point 106. For example, based upon identification of one or more cars of the video image by the video analysis module 202, the merge point sequence determination module 208 may count each car leaving each lane 102 and 104 via the merge point 106. In addition, the merge point sequence determination module 208 may be used for correct sequencing of orders as cars pull to the drive-thru window to pay for and receive their order.

In one embodiment, the incoming traffic counter module 204, the outgoing traffic counter module 206 and the merge point sequence determination module 208 can be implemented by a single video-based vehicle tracking module that detects vehicles when they enter one of the order lanes 102 or 104, and tracks them or determines their trajectory as they traverse the lane and exit it via the merge point 106 or other exit points.

In one embodiment, the overall per lane vehicle counter module 210 may be used to determine the overall number of cars in each lane 102 and 104 based upon the count of cars incoming, outgoing and leaving via the merge point 106 as tracked by the incoming traffic counter module 204, the outgoing traffic counter module 206 and the merge point sequence determination module 208, respectively. In one embodiment, the overall number of cars per lane may be calculated based upon a number of incoming cars minus the number of outgoing cars and number of cars exiting via the merge point 106.

In one embodiment, the recommendation module 212 may make a lane recommendation based upon the overall number of cars per lane calculated by the overall per lane vehicle counter module 210 and one or more weighting factors. The weighting factors may be any one or more of the weighting factors described above.

In one embodiment, if the lanes 102 and 104 are balanced, the recommendation module 212 may make no recommendation. In other words, the car 120 may be free to choose either lane 102 or 104.

In one embodiment, when one of the lanes has reached full capacity according to overall per lane vehicle counter module 210, the recommendation module 212 may recommend, if available, a lane which has yet to reach full capacity.

In one embodiment, the recommendation module 212 may also send a signal to the broadcasting module 116. As a result, the broadcasting module 116 may display the proper recommendation to an incoming car so that the car may select the fastest drive-thru lane between the lanes 102 and 104.

In another embodiment, the recommendation module 212 may send a signal to a user endpoint device, e.g., a smart phone, a tablet computer, and the like. For example, each user may download an application on his or her endpoint device for receiving the recommendation from the recommendation module 212 when the application detects they are located at a drive-thru of the restaurant via a global positioning system (GPS) signal of the endpoint device.

Figure 3:
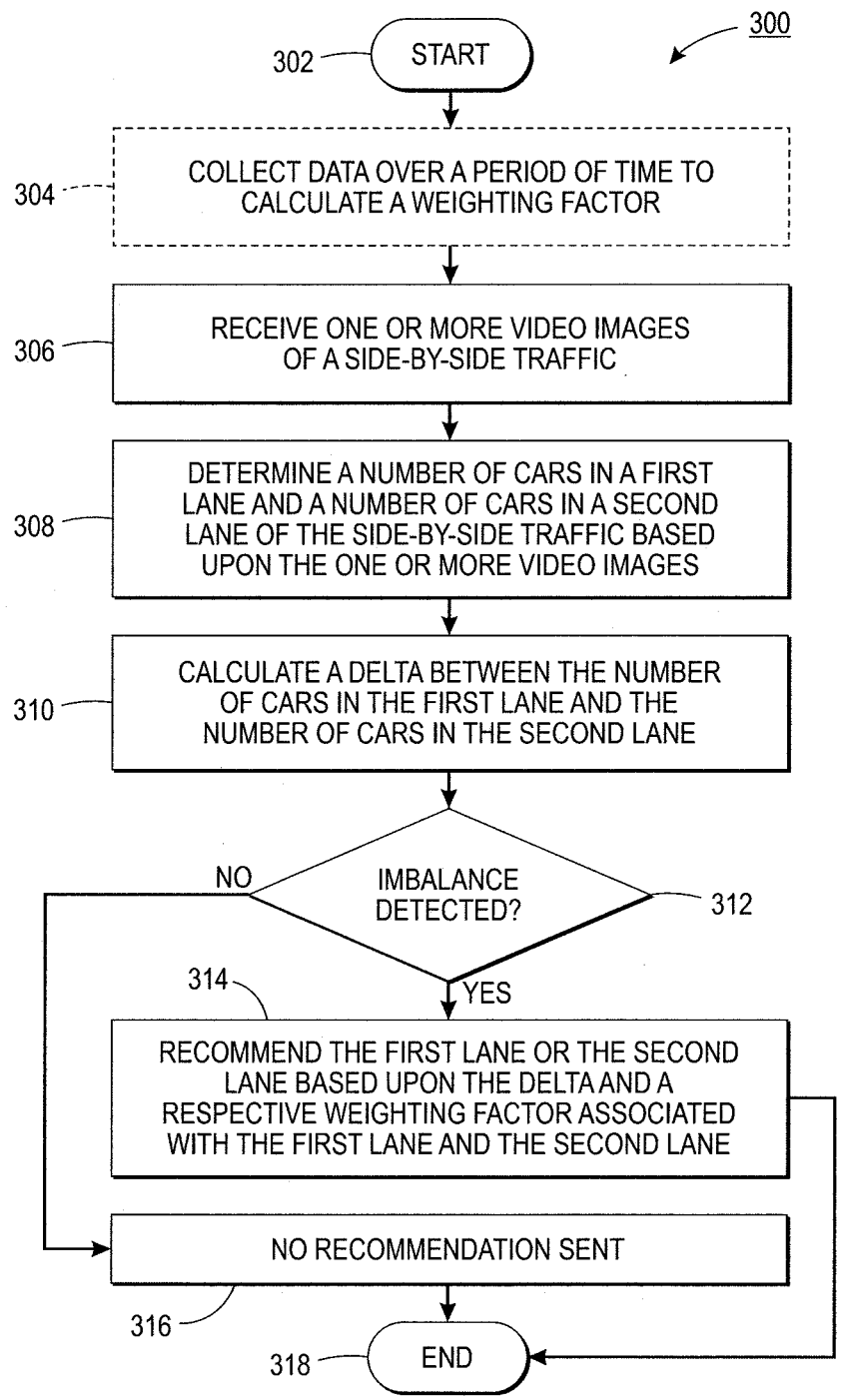
FIG. 3 illustrates an example flowchart of a method for side-by-side traffic location load balancing.
Figure 4:
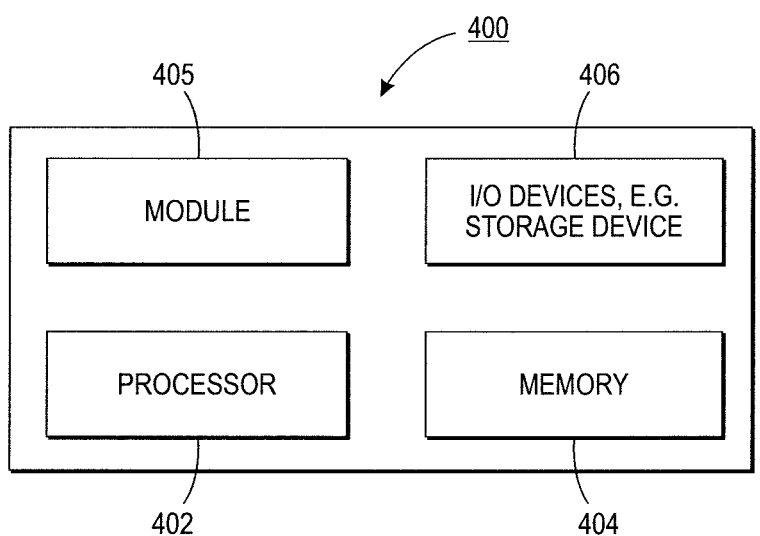
FIG. 4 illustrates a high-level block diagram of a general-purpose computer suitable for use in performing the functions described herein.

FIG. 3 illustrates a flowchart of a method 300 for side-by-side traffic location load balancing. In one embodiment, the side-by-side traffic location may be a drive-thru at a restaurant having a side-by-side configuration. However, it should be noted that the method 300 may be equally applicable to other side-by-side traffic location scenarios where one or more lanes of traffic further split or merge into a different number of lanes prior to receiving a service with service times that may vary across different lanes or across different lines of customers, such as a road or highway that splits into multiple toll booth lanes. In one embodiment, one or more steps or operations of the method 300 may be performed by the AS 112 or a general-purpose computer as illustrated in FIG. 4 and discussed below.

The method 300 begins at step 302. At optional step 304, the method 300 may collect data over a period of time to calculate a weighting factor. As discussed above, the weighting factors may be based upon data collected over a period of time. For example, the period of time may be a month, a year, or any other time period. In another example, the period of time may be a time period an employee has been employed.

In one embodiment, the weighting factors may be based on a collection of data of an expected number of cars to visit the drive-thru at various times in a day based upon a day of the week. For example, data may be collected as a histogram of a number of cars per hour and/or a number of cars per day of the week, and the like.

In one embodiment, the weighting factors may be based on a vehicle type. For example, larger vehicles may tend to correlate with longer order placing intervals. In one embodiment, the weighting factors may also be based on a vehicle occupancy. For example, vehicles with more passengers may have a longer order time due to more orders being placed for the larger number of passengers.

In another embodiment, the weighting factors may be based on a collection of data about performance and order completion rates of the employees. For example, one employee may complete 4 orders per minute while taking orders for the drive-thru 100 and another employee may only complete 1 order per minute while taking orders for the drive-thru.

In one embodiment, the weighting factors may be based on a collection of data regarding each shift change. For example, during an hour when a shift change occurs, the order processing rate and the order completion rate may suffer. In another example, the order processing rate and order completion rate may be faster for the morning shift than an afternoon shift, and the like.

In one embodiment, the weighting factors may be calculated for a left lane and a right lane of a drive-thru having a side-by-side configuration independently. In other words, the left lane and the right lane may have different weighting factors. For example, depending on which employee is taking orders for the left lane and the right lane the weighting factor may be different for each lane.

In one embodiment, the weighting factor may be based upon one or more of the collection of data described above over a sliding window (e.g., every 10 minutes, every hour, and the like). In other words, the weighting factors may change during different times or periods during the day to account for a change in an expected number of cars, a shift change or a change in the employee working the drive-thru. Weighting of a lane count can be implemented via multiplicative, additive, and other linear and non-linear functions of the count, so as to penalize or reward the determined count relative to one or more of the weighting factors described above.

At step 306, the method 300 receives one or more video images of the side-by-side traffic. For example, a video camera monitoring a drive-thru may send video images of a region of interest to an application server. In one embodiment, a video analysis module may analyze the video images such that other modules may track a number of incoming cars, a number of outgoing cars, a number of cars exiting via a merge point and an overall count of cars in each lane of the drive-thru.

At step 308, the method 300 determines a number of cars in a first lane and a number of cars in a second lane of the drive-thru based upon the one or more video images. For example, a video analysis module may identify portions of the video image within the region of interest as cars. Based upon the number of incoming cars, a number of outgoing cars, a number of cars exiting via a merge point, an overall number of cars in each lane may be calculated.

At step 310, the method 300 calculates a delta between the number of cars in the first lane and the number of cars in the second lane. For example, the delta may be a difference between the number of cars in the first lane and the number of cars in the second lane. It should be noted that although the method 300 provides an example including only two lanes, the method 300 may be equally applied to side-by-side traffic of vehicles or pedestrians in any number of lanes or more than two lanes.

At step 312, the method 300 determines if an imbalance is detected. For example, based upon the delta if the delta is greater than a predetermined threshold, the method 300 may detect an imbalance. If the delta is less than the predetermined threshold, the method 300 may detect no imbalance. If no imbalance is detected, the method 300 may proceed to step 316.

At step 316, the method 300 does not send a recommendation. Alternatively, the method 300 may send a recommendation indicating either lane is equally fast and that the customer may choose either lane freely. In other words, in one embodiment, not sending a recommendation or recommending both lanes may be considered to be equivalent. The method 300 then proceeds to step 318 where the method 300 ends.

Referring back to step 312, if an imbalance is detected, the method 300 may proceed to step 314. At step 314, the method 300 recommends the first lane or the second lane based upon the delta and a respective weighting factor associated with the first lane and the second lane to load balance the drive-thru. The weighting factors may be any one or more of the weighting factors discussed above.

In one embodiment, by considering the weighting factors in addition to the delta, the recommendation may be improved. For example, if a first lane has one car and a second lane has two cars, using the delta alone would lead to a recommendation of the first lane. However, using the weighting factors, it may be that the employee serving the second lane at a particular time of day on a particular shift processes and completes orders four times faster than the employee serving the first lane. Thus, the second lane may be the better lane to enter and be recommended since the second lane may process orders four times faster than the first lane when the weighting factors are considered in addition to the delta.

In one embodiment, the recommendations may be bounded by a physical size of the drive-thru lanes. For example, if the second lane can only hold three cars and another car is about to enter the drive-thru, the method 300 may be forced to recommend the first lane since the second lane would already be full with three cars. The method 300 then proceeds to step 318 where the method 300 ends.

It should be noted that although not explicitly specified, one or more steps, functions, or operations of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 3 that recite a determining operation, or involve a decision, do not necessarily require that both branches of the determining operation be practiced. In other words, one of the branches of the determining operation can be deemed as an optional step.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for load balancing side-by-side traffic, and various input/output devices 406 (e.g., storage devices, including but not limited to, a tape drive, a floppy drive, a hard disk drive or a compact disk drive, a receiver, a transmitter, a speaker, a display, a speech synthesizer, an output device (such as a graphic display, printer, and the like), an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 405 for load balancing side-by-side traffic can be loaded into memory 404 and executed by processor 402 to implement the functions as discussed above. As such, the present method 405 for load balancing side-by-side traffic (including associated data structures) of the present disclosure can be stored on a non-transitory (e.g., physical and tangible) computer readable storage medium, e.g., RAM memory, magnetic or optical drive or diskette and the like. For example, the hardware processor 402 can be programmed or configured with instructions (e.g., computer readable instructions) to perform the steps, functions, or operations of method 300.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for side-by-side traffic location load balancing, comprising:

receiving, by a processor, one or more video images of a side-by-side traffic location;

determining, by the processor, a number of cars in a first lane and a number of cars in a second lane of the side-by-side traffic location based upon the one or more video images;

calculating, by the processor, a delta between the number of cars in the first lane and the number of cars in the second lane; and recommending, by the processor, to an entering car on a broadcasting module at an entrance of the side-by-side traffic location the first lane or the second lane based upon the delta and a first weighting factor associated with the first lane and a second weighting factor associated with the second lane to provide a load balance of the cars at the side-by-side traffic location, wherein the broadcasting module displays a right arrow corresponding to the first lane or a left arrow corresponding to the second lane, wherein the first weighting factor and the second weighting factor are each a function of an order completion rate of one or more employees based on data that is collected regarding each one of the one or more employees over a period of time that a respective employee has been employed, a shift change, a day and a time, an expected number of cars during the day or the time, a type of vehicle and a vehicle occupancy.

2. The method of claim 1, wherein the one or more video images are captured by a video camera monitoring the side-by-side traffic location.

3. The method of claim 1, wherein the number of cars in the first lane and the number of cars in the second lane are each calculated as a function of cars entering a respective lane, cars leaving the respective lane and cars entering a merge point.

4. The method of claim 1, wherein the side-by-side traffic location comprises a drive-thru.

5. The method of claim 1, wherein the first weighting factor and the second weighting factor are determined over a sliding window.

6. The method of claim 1, wherein the recommending is bounded by a maximum number of cars that the first lane or the second lane can hold.

7. The method of claim 1, wherein the recommending further comprises sending a signal to a user endpoint device instructing a customer which lane to enter.

8. A non-transitory computer-readable medium storing a plurality of instructions, which when executed by a processor, cause the processor to perform operations for side-by-side traffic location load balancing, the operations comprising:

receiving one or more video images of a side-by-side traffic location;

determining a number of cars in a first lane and a number of cars in a second lane of the side-by-side traffic location based upon the one or more video images;

calculating a delta between the number of cars in the first lane and the number of cars in the second lane; and recommending to an entering car on a broadcasting module at an entrance of the side-by-side traffic location the first lane or the second lane based upon the delta and a first weighting factor associated with the first lane and a second weighting factor associated with the second lane to provide a load balance of the cars at the side-by-side traffic location, wherein the broadcasting module displays a right arrow corresponding to the first lane or a left arrow corresponding to the second lane, wherein the first weighting factor and the second weighting factor are each a function of an order completion rate of one or more employees based on data that is collected regarding each one of the one or more employees over a period of time that a respective employee has been employed, a shift change, a day and a time, an expected number of cars during the day or the time, a type of vehicle and a vehicle occupancy.

9. The non-transitory computer-readable medium of claim 8, wherein the one or more video images are captured by a video camera monitoring the side-by-side traffic location.

10. The non-transitory computer-readable medium of claim 8, wherein the number of cars in the first lane and the number of cars in the second lane are each calculated as a function of cars entering a respective lane, cars leaving the respective lane and cars entering a merge point.

11. The non-transitory computer-readable medium of claim 8, wherein the side-by-side traffic location comprises a drive-thru.

12. The non-transitory computer-readable medium of claim 8, wherein the first weighting factor and the second weighting factor are determined over a sliding window.

13. The non-transitory computer-readable medium of claim 8, wherein the recommending is bounded by a maximum number of cars that the first lane or the second lane can hold.

14. The non-transitory computer-readable medium of claim 8, wherein the recommending further comprises sending a signal to a user endpoint device instructing a customer of the entering car which lane to enter.

15. A method for load balancing a drive-thru having a side-by-side configuration, comprising:
   collecting, by a processor, data over a period of time that each employee has been employed, wherein the data is related to an order completion rate of the each employee working at the drive-thru, an order completion rate of each shift of a restaurant, and an average number of cars in each lane at various time periods over a day for each day of a week;
   calculating, by the processor, a first weighting factor for a first lane and a second weighting factor for a second lane of the drive-thru based upon the data collected for a first employee currently working the first lane and a second employee currently working the second lane, a shift, a time of day, a type of vehicle and a vehicle occupancy;
   receiving, by the processor, one or more video images of the drive-thru having the side-by-side configuration;
   determining, by the processor, a number of cars in the first lane and a number of cars in the second lane of the drive-thru based upon the one or more video images;
   calculating, by the processor, a delta between the number of cars in the first lane and the number of cars in the second lane; and
   recommending, by the processor, to an entering car on a broadcasting module at an entrance of the side-by-side traffic location the first lane or the second lane based upon the delta and the first weighting factor associated with the first lane and the second weighting factor associated with the second lane to provide a load balance of the cars at the drive-thru, wherein the broadcasting module displays a right arrow corresponding to the first lane or a left arrow corresponding to the second lane.

16. The method of claim 15, wherein the number of cars in the first lane and the number of cars in the second lane are each calculated as a function of cars entering a respective lane, cars leaving the respective lane and cars entering a merge point.

* * * * *